US009628012B2

(12) United States Patent
Handa (10) Patent No.: US 9,628,012 B2
(45) Date of Patent: Apr. 18, 2017

(54) MOTOR CONTROL DEVICE AND MOTOR CONTROL METHOD

(75) Inventor: Go Handa, Chiryu (JP)

(73) Assignee: DENSO CORPORATION, Kariya (JP)

( * ) Notice: Subject to any disclaimer, the term of this patent is extended or adjusted under 35 U.S.C. 154(b) by 394 days.

(21) Appl. No.: 14/239,158

(22) PCT Filed: Jul. 25, 2012

(86) PCT No.: PCT/JP2012/004734
§ 371 (c)(1),
(2), (4) Date: Feb. 17, 2014

(87) PCT Pub. No.: WO2013/046520
PCT Pub. Date: Apr. 4, 2013

(65) Prior Publication Data
US 2014/0167659 A1 Jun. 19, 2014

(30) Foreign Application Priority Data
Sep. 28, 2011 (JP) ................... 2011-212129

(51) Int. Cl.
*H02P 21/00* (2016.01)
*H02P 21/06* (2016.01)
(Continued)

(52) U.S. Cl.
CPC .......... *H02P 21/0035* (2013.01); *H02P 21/06* (2013.01); *H02P 21/14* (2013.01); *H02P 21/22* (2016.02)

(58) Field of Classification Search
USPC .................................................. 318/400.02
See application file for complete search history.

(56) References Cited

U.S. PATENT DOCUMENTS

| 2009/0160377 A1* | 6/2009 | Yamada | H02M 7/53871 318/400.02 |
|---|---|---|---|
| 2010/0165674 A1* | 7/2010 | Dai | H02M 7/53873 363/37 |

(Continued)

FOREIGN PATENT DOCUMENTS

| JP | 01-259761 A | 10/1989 |
|---|---|---|
| JP | 2008-228419 A | 9/2008 |
| JP | 2010-166716 A | 7/2010 |

OTHER PUBLICATIONS

International Search Report and Written Opinion of the International Searching Authority mailed Oct. 16, 2012 for the corresponding international application No. PCT/JP2012/004734 (with English translation).

(Continued)

*Primary Examiner* — Eduardo Colon Santana
*Assistant Examiner* — Said Bouziane
(74) *Attorney, Agent, or Firm* — Posz Law Group, PLC (57) ABSTRACT

In an αβ coordinate system, vectors of currents flowing in three-phase AC motor are set in directions fixed relative to a zero vector current according to a voltage applied in six non-zero vector switching modes of an inverter. A current vector closest to a command current value is specified from those current vectors. Then, only a non-zero vector current when operating the inverter in the non-zero vector switching mode corresponding to the specified current vector is calculated.

6 Claims, 6 Drawing Sheets

(51) Int. Cl.
*H02P 21/14* (2016.01)
*H02P 21/22* (2016.01)
*H02P 27/06* (2006.01)
*H02M 5/45* (2006.01)

(56) References Cited

U.S. PATENT DOCUMENTS

| | | | |
|---|---|---|---|
| 2010/0219780 A1* | 9/2010 | Morimoto | H02P 21/0089 318/400.02 |
| 2010/0259204 A1 | 10/2010 | Imura | |
| 2010/0262307 A1 | 10/2010 | Imura | |
| 2010/0301788 A1* | 12/2010 | Chen | H02P 21/0003 318/400.3 |
| 2011/0074320 A1* | 3/2011 | Nakamura | H02P 5/74 318/400.02 |
| 2011/0169436 A1* | 7/2011 | Takahashi | H02P 23/14 318/400.3 |
| 2012/0293095 A1* | 11/2012 | Imura | H02P 27/08 318/139 |

OTHER PUBLICATIONS

Hirokazu Kobayashi et al., "Realization of Current Control System of PMSM Using Model Predictive Control." IEEJ Industry Applications Society, Nagoya University, Japan (with English translation).

* cited by examiner

| SWITCHING MODES (VOLTAGE VECTOR) | ON-STATE SWITCHING ELEMENTS | | |
|---|---|---|---|
| | U-PHASE | V-PHASE | W-PHASE |
| V0 | LOWER | LOWER | LOWER |
| V1 | UPPER | LOWER | LOWER |
| V2 | UPPER | UPPER | LOWER |
| V3 | LOWER | UPPER | LOWER |
| V4 | LOWER | UPPER | UPPER |
| V5 | LOWER | LOWER | UPPER |
| V6 | UPPER | LOWER | UPPER |
| V7 | UPPER | UPPER | UPPER |

MOTOR CONTROL DEVICE AND MOTOR CONTROL METHOD

CROSS REFERENCE TO RELATED APPLICATION

This application is a U.S. national stage application of PCT/JP2012/004734 filed on Jul. 25, 2012, and is based on Japanese Patent Application No. 2011-212129 filed on Sep. 28, 2011, the disclosures of which are incorporated herein by reference.

TECHNICAL FIELD

The present disclosure relates to a motor control device and a motor control method for controlling rotation of a three-phase AC motor.

BACKGROUND ART

In the conventional motor control device and motor control method, a switching mode of an inverter is determined so that a current that flows in a three-phase AC motor matches a command current, the inverter operates in the determined switching mode, and a voltage corresponding to the switching mode is applied to the three-phase AC motor, to thereby control the rotation of the three-phase AC motor.

As the above-mentioned motor control device and motor control method, there is a triangle wave comparison PWM control of the three-phase AC motor. This control method calculates a command voltage for each phase according to an error between a current command value and a current flowing in each phase, and determines the switching mode of the inverter on the basis of the calculated command voltage and a magnitude of carriers having a triangle waveform.

As a disclosure of a technique for improving a response of a current in the triangle wave comparison PWM control, for example, Patent Document 1 and Patent Document 2 have been known.

In a control method disclosed in Patent Document 1, future currents (torques) in all of the switching modes of the inverter are predicted with the use of a motor model on the basis of a current flowing in the motor, a magnetic pole position of a rotor, and a rotational speed of the rotor. Then, the control method selects any switching mode for generating the future current (torque) that minimizes the error relative to a current (torque) command value for controlling the motor, and drives the inverter in the switching mode.

Also, in Patent Document 2, predicted currents ide(n+1) and iqe(n+1) in one subsequent control cycle are calculated on the basis of a voltage vector (switching mode) V(n) of the existing inverter so that a controlled variable by a model prediction control disclosed in Patent Document 1 is predicted with higher precision. The predicted currents ide(n+1) and iqe(n+1) are set as defaults, and predicted currents ide(n+2) and iqe(n+2) in a further one subsequent control cycle are calculated for each voltage vector V(n+1). Then, a voltage vector V(n+1) in one subsequent control cycle is determined by an evaluation function J having the predicted currents ide(n+2) and iqe(n+2) as inputs so that the error relative to the command current becomes smallest.

PRIOR ART DOCUMENTS

Patent Document

[Patent Document 1] JP-A-2008-228419
[Patent Document 2] JP-A-2010-252433 (corresponding to US2010/00262307A1)

SUMMARY OF INVENTION

In both of the techniques disclosed in the above-mentioned Patent Documents 1 and 2, the switching mode for predicting the future current likely to flow in the motor and generating a current that minimizes the error relative to the command current is selected from all of the switching modes (all of voltage vectors) of the inverter.

For that reason, there arises such a problem that an arithmetic processing load for determining the switching mode of the inverter which drives the motor increases. In particular, when a complicated model considering an inductance L, a nonlinearity of the number $\phi$ of interlinkage fluxes, or the disturbance is created as the motor model, this problem becomes more serious.

Further, the above arithmetic processing needs to be completed within a control cycle of the motor. In this example, for example, in order to make the phase resolution of the control cycle of the motor equivalent to the phase resolution of the above-mentioned triangle wave comparison PWM control, it is desirable that the control cycle of the motor is set to about several $\mu s$. For that reason, when the above arithmetic processing is to be realized by hardware, because the serial processing has no time to conduct the above arithmetic processing, parallel processing needs to be conducted by a large number of arithmetic portions, or a multidimensional state space map (table of a switching mode) for determining the switching mode needs to be prepared with a state quantity of a rotational speed or a current as an input. This leads to such a problem that the circuit scale is enlarged. Also, when the arithmetic processing is to be realized by software, a high-performance microcomputer excellent in the processing speed is necessary, resulting in such a problem that the costs increase.

The present disclosure has been made from the above-mentioned viewpoints, and aims at providing a motor control device and a motor control method which can remarkably reduce an arithmetic processing load for determining a switching mode of an inverter that drives a motor.

A motor control device according to an aspect of the present disclosure determines a switching mode of an inverter so that a current flowing in a three-phase AC motor matches a command current, allows the inverter to operate in the determined switching mode, and applies a voltage corresponding to the switching mode to the three-phase AC motor to control the rotation of the three-phase AC motor. The motor control device includes a zero vector current arithmetic portion, a current vector selection portion, a non-zero vector current arithmetic portion, and a current selection portion.

The zero vector current arithmetic portion calculates a current predicted to flow in the three-phase AC motor as a zero-vector current when operating the inverter in a zero vector switching mode in which no voltage is applied to the three-phase AC motor. The current vector selection portion selects a current vector closest to the command current among current vectors flowing in the three-phase AC motor which are set in directions fixed relative to the zero vector current when operating the inverter in six non-zero vector switching modes where a voltage is applied to the three-phase AC motor, in an $\alpha\beta$ static coordinate system which is defined by an $\alpha$-axis and a $\beta$-axis orthogonal to each other with a rotation axis of a rotor of the three-phase AC motor as an origin. The non-zero vector current arithmetic portion calculates a current predicted to flow in the three-phase AC motor as the non-zero vector current when operating the inverter in the non-zero vector switching modes corresponding to the current vector selected by the current vector selection portion. The current selection portion selects a current close to the command from the zero vector current and the non-zero vector current. The switching mode corresponding to a current selected by the current selection portion is determined as the switching mode of the inverter.

The above motor control device can remarkably reduce the arithmetic processing load for determining the switching mode of the inverter that drives the motor.

A motor control method according to another aspect of the present disclosure determines a switching mode of an inverter so that a current flowing in a three-phase AC motor matches a command current, allows the inverter to operate in the determined switching mode, and applies a voltage corresponding to the switching mode to the three-phase AC motor to control the rotation of the three-phase AC motor. In the motor control method, a current predicted to flow in the three-phase AC motor is calculated as a zero-vector current when operating the inverter in a zero vector switching mode in which no voltage is applied to the three-phase AC motor. A current vector closest to the command current is selected among current vectors flowing in the three-phase AC motor which are set in directions fixed relative to the zero vector current when operating the inverter in six non-zero vector switching modes where a voltage is applied to the three-phase AC motor, in an $\alpha\beta$ static coordinate system which is defined by an $\alpha$-axis and a $\beta$-axis orthogonal to each other with a rotation axis of a rotor of the three-phase AC motor as an origin. A current predicted to flow in the three-phase AC motor is calculated as the non-zero vector current when operating the inverter in the non-zero vector switching mode corresponding to the selected current vector. A current close to the command current is selected from the zero vector current and the non-zero vector current. The switching mode corresponding to the selected current is determined as the switching mode of the inverter.

The above motor control method can remarkably reduce the arithmetic processing load for determining the switching mode of the inverter that drives the motor.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, various aspects of the present disclosure will be described.

A motor control device according to an aspect of the present disclosure determines a switching mode of an inverter so that a current flowing in a three-phase AC motor matches a command current, allows the inverter to operate in the determined switching mode, and applies a voltage corresponding to the switching mode to the three-phase AC motor to control the rotation of the three-phase AC motor. The motor control device includes a zero vector current arithmetic portion, a current vector selection portion, a non-zero vector current arithmetic portion, and a current selection portion.

The zero vector current arithmetic portion calculates a current predicted to flow in the three-phase AC motor as a zero-vector current when operating the inverter in a zero vector switching mode in which no voltage is applied to the three-phase AC motor. The current vector selection portion selects a current vector closest to the command current among current vectors flowing in the three-phase AC motor which are set in directions fixed relative to the zero vector current when operating the inverter in six non-zero vector switching modes where a voltage is applied to the three-phase AC motor, in an $\alpha\beta$ static coordinate system which is defined by an $\alpha$-axis and a $\beta$-axis orthogonal to each other with a rotation axis of a rotor of the three-phase AC motor as an origin. The non-zero vector current arithmetic portion calculates a current predicted to flow in the three-phase AC motor as the non-zero vector current when operating the inverter in the non-zero vector switching mode corresponding to the current vector selected by the current vector selection portion. The current selection portion selects a current close to the command current from the zero vector current and the non-zero vector current. The switching mode corresponding to a current selected by the current selection portion is determined as the switching mode of the inverter.

In the motor control device, attention is focused on a fact that the vectors of the currents flowing in the three-phase AC motor are set in directions fixed relative to the zero vector current according to the voltages to be applied in the six non-zero vector switching modes of the inventor, in the $\alpha\beta$ static coordinate system. Since orientations of the vectors of the respective currents are set on the basis of the zero vector current, even if values of those currents per se are not calculated, the vector of a current closest to the command current can be discriminated when the command current is plotted in the same coordinate system. From this viewpoint, the current vector selection portion selects the current vector closest to the command current among the current vectors.

Then, in the non-zero vector current arithmetic portion, when the inverter operates in the non-zero vector switching mode corresponding to the selected current vector, the current predicted to flow in the three-phase AC motor is calculated as the non-zero vector current. For that reason, there is no need to calculate the current predicted to flow in the three-phase AC motor in correspondence with all of the non-zero vector switching modes, and the arithmetic processing load can be remarkably reduced.

It is evaluated which of the non-zero vector current and the zero vector current is closer to the command current, by the current selection portion, and the current closer to the command current is selected. This is because it cannot be determined which of the non-zero vector current by the current vector and the zero vector current is closer to the command current, in a state of the current vector.

The non-zero vector current arithmetic portion may calculate the current generated by applying the voltage corresponding to the non-zero vector switching mode to the three-phase AC motor when the inverter operates in the non-zero vector switching mode corresponding to the selected current vector, and may calculate the non-zero vector current by adding the calculated current to the zero vector current calculated by the zero vector current arithmetic portion.

As disclosed in Patent Documents 1 and 2, a current predicted to flow in the three-phase AC motor after several clock times can be calculated by Expression 2 obtained by discretizing, for example, the following Expression 1.

$$\frac{d}{dt}\begin{bmatrix} id \\ iq \end{bmatrix} = \begin{bmatrix} -\frac{Ra}{Ld} & \omega\frac{Lq}{Ld} \\ -\omega e \frac{Ld}{Lq} & -\frac{Ra}{Lq} \end{bmatrix} \quad \text{[EX. 1]}$$

$$\begin{bmatrix} id_{(t)} \\ iq_{(t)} \end{bmatrix} + \begin{bmatrix} \frac{1}{Ld} & 0 \\ 0 & \frac{1}{Lq} \end{bmatrix} \begin{bmatrix} vd \\ vq \end{bmatrix} + \begin{bmatrix} 0 \\ -\frac{\omega\phi}{Lq} \end{bmatrix}$$

$$i_{dq}(n+1) = A \cdot i_{dq}(n) + B \cdot v_q(n) + F \quad \text{[EX. 2]}$$

In the above Expression 1, id and iq are a d-axis current and a q-axis current, respectively, Ra is a winding resistance, Ld and Lq are a d-axis inductance and a q-axis inductance, respectively, vd and vq are a d-axis voltage and a q-axis voltage, respectively, and ω is a motor rotating angle velocity, and φ is the number of interlinkage fluxes.

In the above Expression 2, a left side is predicted currents id(n+1) and iq(n+1). A first term on a right side is a term in which present currents id(n) and iq(n) are multiplied by a coefficient A, and mainly determined on the basis of the present current. A second term on the right side is a term in which the inverter voltages vd(n) and vq(n) are multiplied by a coefficient B, and mainly determined by an inverter voltage. A third term F on the right side is a term for calculating a current generated by a speed electromotive force of the motor. Also, the coefficients A and B are a coefficient matrix of a winding resistance, an inductance, or the motor rotating angle velocity or the like. Thus, the predicted current can be mainly obtained by the present current, a current generated by the inverter voltage, and a current generated by the speed electromotive force of the motor.

In this example, because the zero vector current is a current when the inverter voltage is zero, the zero vector current can be calculated on the basis of the present current, and the current caused by the speed electromotive force of the motor. Then, the non-zero vector current can be calculated by calculating the current generated by the inverter voltage, and adding the calculated current to the zero vector current. With the above operation, since there is no need to again calculate the third term for calculating the first term calculated on the basis of the present current, and the third term for calculating the current generated by the speed electromotive force of the motor when calculating the non-zero vector current, the arithmetic load can be further reduced.

The non-zero vector current arithmetic portion may calculate the current generated in the three-phase AC motor assuming that a magnitude of the voltage to be applied to the three-phase AC motor is kept constant by the inverter when the inverter operates in the non-zero vector switching mode.

For example, when the magnitude of the input voltage to the inverter is kept substantially constant by connecting a capacitor having a relatively large capacitance to the inverter, a current generated by the inverter voltage can be calculated by merely considering the rotating angle of the motor, and the arithmetic processing can be more simplified.

A motor control method according to another aspect of the present disclosure determines a switching mode of an inverter so that a current flowing in a three-phase AC motor matches a command current, allows the inverter to operate in the determined switching mode, and applies a voltage corresponding to the switching mode to the three-phase AC motor to control the rotation of the three-phase AC motor. In the motor control method, a current predicted to flow in the three-phase AC motor is calculated as a zero-vector current when operating the inverter in a zero vector switching mode in which no voltage is applied to the three-phase AC motor. A current vector closest to the command current is selected among current vectors flowing in the three-phase AC motor which are set in directions fixed relative to the zero vector current when operating the inverter in six non-zero vector switching modes where a voltage is applied to the three-phase AC motor, in an αβ static coordinate system which is defined by an α-axis and a β-axis orthogonal to each other with a rotation axis of a rotor of the three-phase AC motor as an origin. A current predicted to flow in the three-phase AC motor is calculated as the non-zero vector current when operating the inverter in the non-zero vector switching mode corresponding to the selected current vector. A current close to the command current is selected from the zero vector current and the non-zero vector current. The switching mode corresponding to the selected current is determined as the switching mode of the inverter.

In the step of calculating the non-zero vector current, a current generated by applying the voltage corresponding to the non-zero vector voltage switching mode to the three-phase AC motor when operating the inverter in the non-zero vector switching mode corresponding to the selected current vector may be calculated, and the non-zero vector current may be calculated by adding the calculated current to the zero vector current.

In the step of calculating the non-zero vector current, a current generated by the three-phase AC motor may be calculated assuming that a magnitude of the voltage to be applied to the three-phase AC motor is kept constant by the inverter, when operating the inverter in the non-zero vector switching mode.

Hereinafter, embodiments of the present disclosure will be described with reference to the attached drawings.

(First Embodiment)

Figure 1:
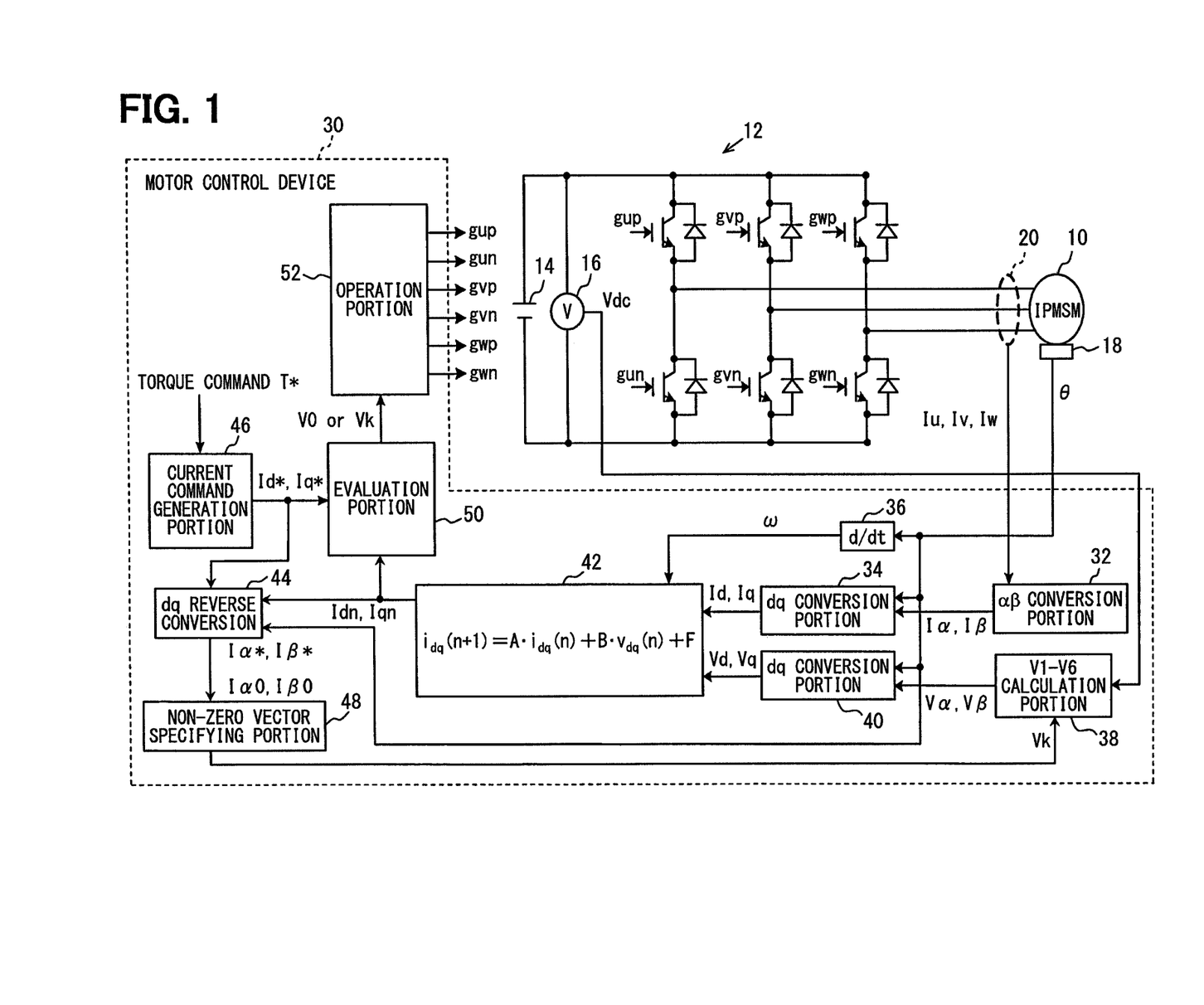
FIG. 1 is a block diagram illustrating a motor control device according to a first embodiment of the present disclosure.

Hereinafter, a motor control device and a motor control method according to a first embodiment of the present disclosure will be described with reference to the drawings. FIG. 1 is a block diagram illustrating a motor control device according to the present embodiment.

A motor 10 to be controlled by a motor control device 30 according to the present embodiment is a synchronous motor including stator windings of three phases (U-phase, V-phase, W-phase), and a rotor made of permanent magnet. In the present embodiment, particularly, a synchronous motor (IPMSM) of a revolving field type having a structure in which the permanent magnet is embedded into the rotor is employed as the synchronous motor 10.

Referring to FIG. 1, the motor 10 is connected to a power supply 14 through an inverter 12. The inverter 12 includes six switching elements (for example, IGBTs) paired in correspondence with a U-phase, a V-phase, and a W-phase of the motor 10. That is, in the inverter 12, paired high potential side and low potential side switching elements are disposed for each of the phases of the motor 10. Connection lines between the high potential side and low potential side switching elements are connected to the respective phases of the motor 10. The respective switching elements are connected with protective diodes.

The motor control device 30 outputs operation signals gup, gun, gvp, gvn, gwp, and gwn to the respective switching elements of the inverter 12, to thereby control on/off states of the respective switching elements in the inverter 12. As a result, the inverter 12 operates in various switching modes. The switching mode may be called "voltage vector".

Figure 2:
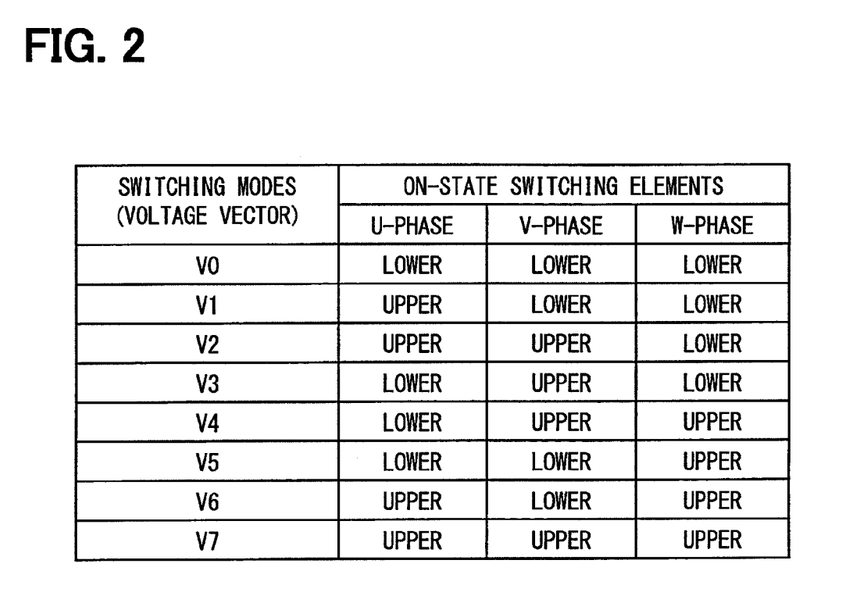
FIG. 2 is a diagram illustrating switching modes of an inverter.

Now, the switching modes of the inverter 12 will be described with reference to FIG. 2. Eight kinds of switching modes in the inverter 12 are provided as illustrated in FIG. 2. In a switching mode V0 and a switching mode V7, only the low potential side switching elements or the high potential side switching elements in each phase of the motor 10 are turned on. For that reason, the switching modes V0 and V7 are modes in which no voltage is applied to the motor 10. Therefore, the switching modes V0 and V7 may use only any one of the switching modes, or may arbitrarily select any switching mode according to the switching mode of the inverter 12 before switching, and use the selected switching mode. The switching modes V0 and V7 are called "zero vector switching modes".

On the other hand, in the remaining switching modes V1 to V6 other than the switching modes V0 and V7, there are switching elements in which both of the high potential side and the low potential side are on-state. For that reason, in the switching modes V1 to V6, the voltage having a vector corresponding to the switching element that is in the on-state is applied to the motor 10, and a current corresponding to the applied voltage flows in the motor 10. For that reason, the switching modes V1 to V6 are generically called "non-zero vector switching modes".

A voltage sensor 16 that detects an input voltage to the inverter 12 is disposed in parallel to the power supply 14. An inverter input voltage Vdc detected by the voltage sensor 16 is applied to the motor control device 30. There are further provided a rotating angle sensor 18 that detects a rotating angle (magnetic pole position of the rotor) θ of the motor 10, and a current sensor 20 that detects currents Iu, Iv, and iw flowing in the respective phases (U-phase, V-phase, W-phase) of the motor 10. Detection signals detected by the rotating angle sensor 18, and the current sensor 20 are also supplied to the motor control device 30.

Subsequently, an internal configuration of the motor control device 30 will be described. In the motor control device 30, functions made by the respective blocks illustrated in FIG. 1 can be configured by dedicated arithmetic portions, or the functions in the respective blocks in FIG. 1 can be realized by various kinds of programs to be executed by a microcomputer.

Current detection values in each phase of the motor 10 which are detected by the current sensor 20 are input to a αβ conversion portion 32, and converted into an α-axis current value iα and a β-axis current value iβ in the αβ coordinates. The current sensor 20 does not need to detect the currents of all three phases. If the current sensor 20 detects the currents of at least two phases, the current sensor 20 can convert those currents into the α-axis current value iα and the β-axis current value iβ.

The α-axis current value iα and the β-axis current value iβ output from the αβ conversion portion 32 are input to a dq conversion portion 34. The dq conversion portion 34 converts the α-axis current value iα and the β-axis current value iβ into a d-axis current value id and a q-axis current value iq in the dp coordinates, on the basis of a motor rotating angle θ detected by the rotating angle sensor 18, and outputs those converted values to a predicted current arithmetic portion 42.

In this example, as well known, the dp coordinates are, for example, rotating coordinates which are defined by a q-axis perpendicular to a d-axis which represents a direction from an S-pole toward an N-pole of the rotor. The αβ coordinates are a rest frame defined by the α-axis and the β-axis which are orthogonal to each other with a rotation axis of the rotor as an origin. Since a relative phase relationship between the dp rotating coordinates and the αβ rest frame can be specified by the motor rotating angle θ between the dq rotating coordinates and the αβ rotating coordinates, the coordinate conversions can be mutually conducted.

The motor rotating angle θ detected by the rotating angle sensor 18 is input to the above-mentioned dp conversion portion 34 as well as a rotating angular velocity calculation portion 36, a dq conversion portion 40, and a dq reverse conversion portion 44. The rotating angular velocity calculation portion 36 subjects the motor rotating angle θ to differential processing to calculate a motor rotating angle velocity ω.

The inverter input voltage Vdc detected by the voltage sensor 16 is input to a V1-V6 calculation portion 38. Further, a non-zero vector switching mode Vk corresponding to a current vector closest to a current command value is input to the V1-V6 calculation portion 38 from a non-zero vector specifying portion 48 which will be described later. The V1-V6 calculation portion 38 calculates a voltage vector predicted to be applied to the motor 10 as an α-axis voltage value Vα and a β-axis voltage value Vβ when the inverter 12 is actuated by the non-zero vector switching mode Vk, on the basis of the input inverter input voltage Vdc and the non-zero vector switching mode Vk.

The α-axis voltage value Vα and the β-axis voltage value Vβ calculated by the V1-V6 calculation portion 38 are input to the dq conversion portion 40. The dq conversion portion 40 converts the α-axis voltage value Vα and the β-axis voltage value Vβ into a d-axis voltage value Vd and a q-axis voltage value Vq in the dq coordinates on the basis of the motor rotating angle θ detected by the rotating angle sensor 18, and outputs the converted values to the predicted current arithmetic portion 42.

The predicted current arithmetic portion 42 calculates a predicted current in the future, that is, in one subsequent control cycle, with the use of the above-mentioned Expression 2, on the basis of the motor rotating angle velocity ω, the d-axis current value id and q-axis current value iq indicative of the present motor current, and the d-axis voltage value Vd and the q-axis voltage value Vq indicative of the inverter voltage (vector voltage) when the non-zero vector switching mode Vk is selected.

The predicted current arithmetic portion 42 first calculates zero vector currents Id0 and Iq0 predicted to flow in the motor 10 when the inverter 12 operates in the zero vector switching mode V0 (V7), on the basis of motor parameters such as the winding resistance, the inductance, or the number of interlinkage fluxes of the motor, a known value including a discrete time, the calculated motor rotating angle velocity ω, and the d-axis current value id and q-axis current value iq indicative of the present motor current. The zero vector currents Id0 and Iq0 are output to the dq reverse conversion portion 44 and an evaluation portion 50. In order to evaluate which of non-zero vector currents Idk and Iqk output from the predicted current arithmetic portion 42 is closer to command currents Id* and Iq* in the future, the evaluation portion 50 saves the zero vector currents Id0 and Iq0 till the evaluation time thereof.

A current command generation portion 46 calculates the d-axis current command value id* and the q-axis current command value Iq* on the basis of a torque command value T* (or a velocity command value), and outputs the calculated command values to the dq reverse conversion portion 44 and the evaluation portion 50.

The dq reverse conversion portion 44 reversely converts the input current value on the dq coordinates into a current value on the αβ coordinates on the basis of the motor rotating angle θ detected by the rotating angle sensor 18. Specifically, the dq reverse conversion portion 44 reversely converts the zero vector currents Id0 and Iq0 on the dq coordinates into zero vector currents Iα0 and Iβ0 on the αβ coordinates, and also reversely converts the current command values Id*, Iq* on the dq coordinates into current command values Iα*, Iβ* on the αβ coordinates.

The non-zero vector specifying portion 48 receives the zero vector currents Iα0, Iβ0 and the current command values Iα*, Iβ* on the αβ coordinates from the dq reverse conversion portion 44. The non-zero vector specifying portion 48 specifies a current vector Iveck closest to the current command values Iα*, Iβ* on the basis of the zero vector currents Iα0, Iβ0 and the current command values Iα*, Iβ*.

Now, a technique for specifying the current vector Iveck closest to the current command values Iα* and Iβ* in the non-zero vector specifying portion 48 will be described with reference to FIGS. 3 and 4.

Figure 3:
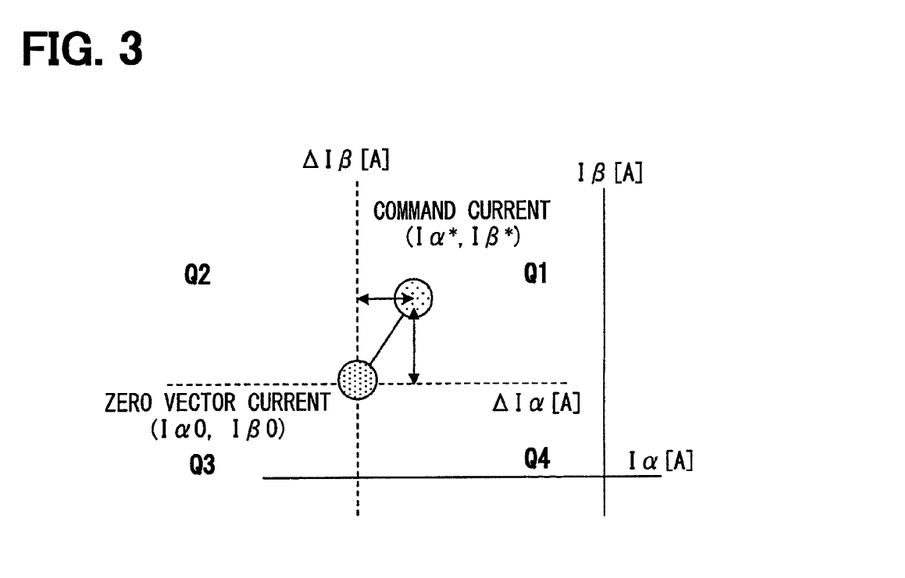
FIG. 3 is a graph illustrating an example in which current command values $I\alpha^*$ and $I\beta^*$ belong to any one of first quadrant Q1 to fourth quadrant Q4 when $\Delta I\alpha$ axis and $\Delta I\beta$ axis are drawn with zero vector currents $I\alpha 0$ and $I\beta 0$ as origins in an $\alpha\beta$ coordinate system.

FIG. 3 is a graph illustrating that the current command values Iα* and Iβ* belong to any one of first quadrant Q1 to fourth quadrant Q4 when a ΔIα axis and a ΔIβ axis are drawn with zero vector currents Iα0 and Iβ0 as origins in an αβ coordinate system.

As illustrated in FIG. 3, in the present embodiment, a quadrant determination for determining that the current command values Iα* and Iβ* belong to any one of the first quadrant Q1 to the fourth quadrant Q4 is first conducted. Specifically, the zero vector currents Iα0 and Iβ0 are subtracted from the current command values Iα* and Iβ*, and it is determined to which quadrant the current command values Iα* and Iβ* belong, according to signs of the α-axis current value and the β-axis current value of the subtraction results. FIG. 3 illustrates an example in which the current command values Iα* and Iβ* belong to the first quadrant Q1.

Figure 4:
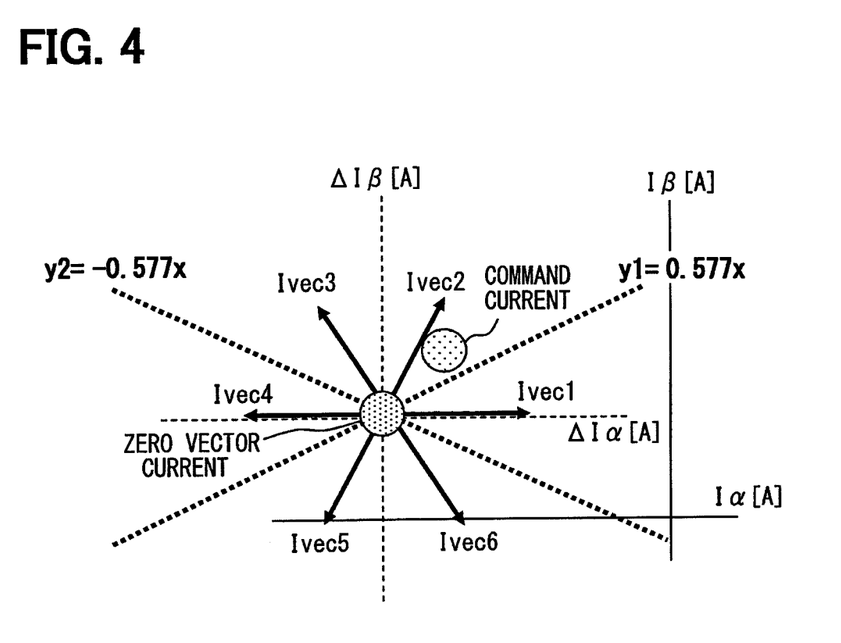
FIG. 4 is a diagram illustrating a technique for specifying a current vector Iveck closest to current command values $I\alpha^*$ and $I\beta^*$.

Subsequently, as illustrated in FIG. 4, the current vector Iveck closest to the current command values Iα* and Iβ* is selected from the current vectors passing through the quadrants to which the current command values Iα* and Iβ* belong.

In this example, as illustrated in FIG. 4, in the αβ coordinates, vectors Ivec1 to Ivec6 of the currents flowing in the motor 10 are determined to a direction fixed to the zero vector currents Iα0 and Iβ0 according to the voltage applied to the motor 10 in the six non-zero vector switching modes V1 to V6 of the inverter 12. For that reason, even if the values of the respective currents flowing in the motor 10 are not calculated in the respective switching modes V1 to V6, the vector Iveck of the current closest to the current command values Iα* and Iβ* can be discriminated.

In an example illustrated in FIG. 4, the current command values Iα* and Iβ* are in the first quadrant, and the current vectors that pass through the first quadrant are Ivec1 and Ivec2. Which of the current vectors Ivec1 and Ivec2 the current command values Iα* and Iβ* are closer to can be determined can be determined according to whether the current command value is disposed above or below a line (y1=0.557x) passing through a just intermediate portion between the current vectors Ivec1 and Ivec2. In the example illustrated in FIG. 4, since the current command values Iα* and Iβ* are disposed above a line (y1=0.577x), it is determined that the closest current vector is Ivec1. Similarly, when the current command values Iα* and Iβ* belong to another quadrant, the closest current vector Iveck can be specified in the same procedure as that described above.

However, even if the current vector Iveck closest to the current command values Iα* and Iβ* can be specified in the current vectors Ivec1 to Ivec6, if the current vector is kept as it is, it is difficult to determine which of the current value caused by the specified current vector Iveck and the zero vector current is closer to the current command values Iα* and Iβ*.

For that reason, in order to calculate the current value by the specified current vector Iveck, the non-zero vector specifying portion 48 outputs the non-zero vector switching mode Vk corresponding to the current vector Iveck to the V1-V6 calculation portion 38. Then, as described above, the V1-V6 calculation portion 38 calculates the inverter voltages (vector voltages) Vα and Vβ predicted to be applied to the motor 10 when the inverter 12 is actuated in the input non-zero vector switching mode Vk. Then, the calculated inverter voltages Vα and Vβ are converted into the dq coordinates by the dq conversion portion 40, and input to the predicted current arithmetic portion 42.

Then, the predicted current arithmetic portion 42 calculates the non-zero vector currents Idk and Iqk predicted to flow in the motor 10 when the inverter 12 operates in the non-zero vector switching mode Vk, on the basis of motor parameters such as the winding resistance, the inductance or the number of interlinkage fluxes of the motor, a known value including a discrete time, the calculated motor rotating angle velocity ω, the d-axis current value id and q-axis current value iq indicative of the present motor current, and the d-axis voltage value Vd and the q-axis voltage value Vq indicative of the inverter voltage (vector voltage) when the non-zero vector switching mode Vk is selected. The calculated non-zero vector currents Idk and Iqk are output to the evaluation portion 50. In the predicted current arithmetic portion 42, the same motor rotating angle velocity ω, d-axis current value id, and q-axis current value iq are used when the zero vector currents Id0 and Iq0 are calculated, and when the non-zero vector currents Idk and Iqk are calculated.

In the evaluation portion 50, it is evaluated which of the zero vector currents Id0, Iq0, and the non-zero vector currents Idk, Iqk is smaller in error relative to the current command values Id* and Iq*. Because the vector current smaller in the error is closer to the current command values Id* and Iq*, the switching mode corresponding to the vector current smaller in the error is determined as an optimum switching mode V0(V7) or Vk, and output to an operation portion 52.

The operation portion 52 generates and outputs an operation signal so as to operate the inverter 12 in the optimum switching mode V0 or Vk according to the optimum switching mode V0 or Vk input from the evaluation portion 50.

Figure 5:
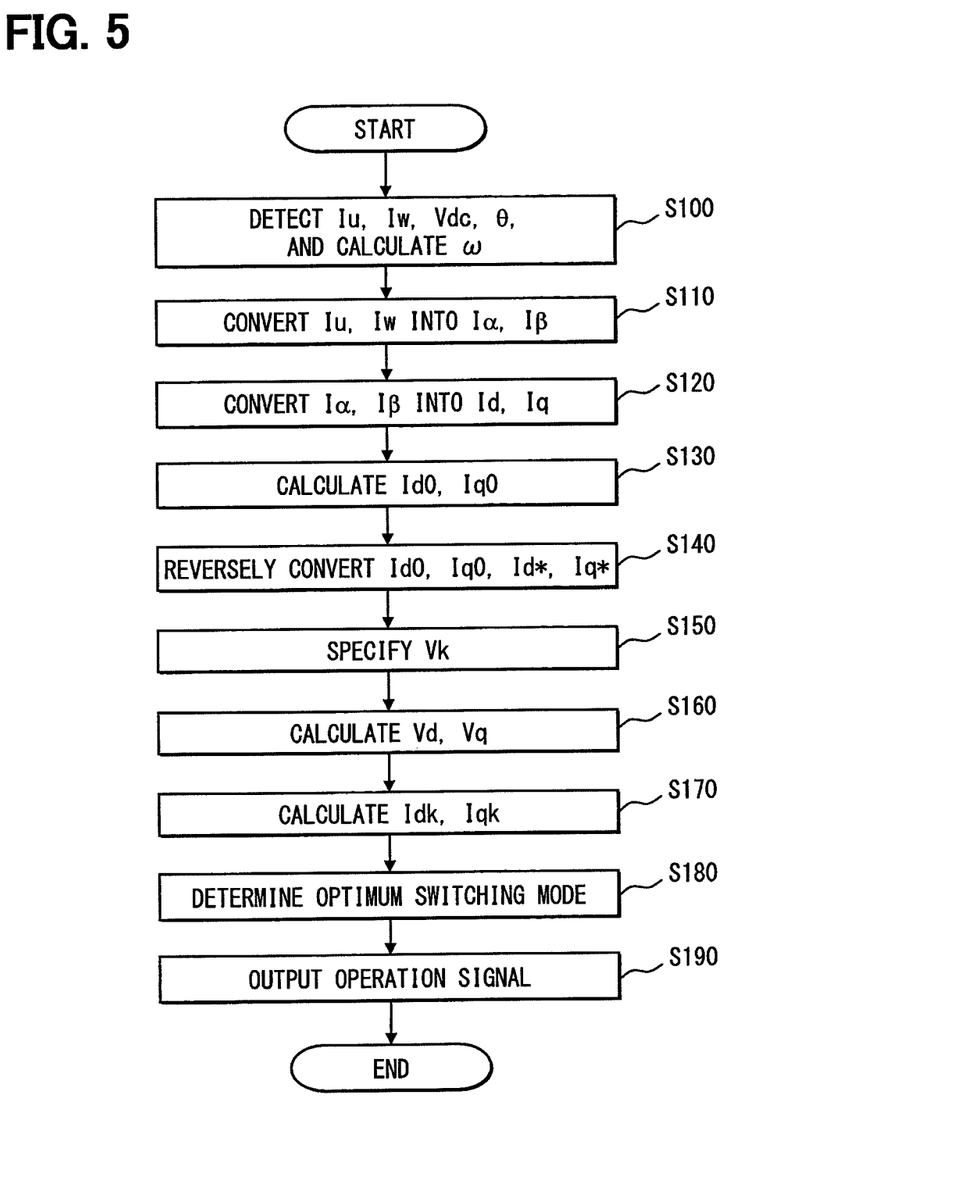
FIG. 5 is a flowchart illustrating a flow of processing for a motor control, which is executed by the motor control device according to the first embodiment.

Subsequently, a flow of processing for the motor control which is executed in the above-mentioned motor control device 30 will be described with reference to a flowchart of FIG. 5. The processing illustrated in the flowchart of FIG. 5 is repeatedly executed every predetermined control cycle.

First, in S100, the current detection values Iu and Iw of a U-phase and a W-phase are input from the current sensor 20, the inverter input voltage Vdc is input from the voltage sensor 16, and the motor rotating angle θ is input from the rotating angle sensor 18. Further, the motor rotating angle velocity ω is calculated from the motor rotating angle θ.

In subsequent S110, the input current detection values Iu and Iw are converted into the α-axis current value iα and the β-axis current value iβ in the αβ coordinates. Further, in S120, the α-axis current value iα and the β-axis current value iβ are converted into the d-axis current value id and the q-axis current value iq in the dq coordinates on the basis of the motor rotating angle θ.

In S130, the zero vector currents Id0 and Iq0 are calculated with the use of the above Expression 2, on the basis of motor parameters such as the winding resistance, the inductance, or the number of interlinkage fluxes of the motor, a known value including a discrete time, the calculated motor rotating angle velocity ω, and the d-axis current value id and q-axis current value iq indicative of the present motor current. Then, in S140, the zero vector currents Id0 and Iq0 on the dq coordinates are reversely converted into the zero vector currents Iα0 and Iβ0 on the αβ coordinates, and also the current command values Id* and Iq* on the dq coordinates are reversely converted into the current command values Iα* and Iβ* on the αβ coordinates.

In S150, in the αβ coordinate systems, the non-zero current vector Iveck closest to the current command values Iα* and Iβ* is determined on the basis of the zero vector currents Iα0, Iβ0, and the current command values Iα*, Iβ*, to specify the non-zero vector switching mode Vk predicted according to the non-zero current vector Iveck. Then, Vd and Vq are calculated in the non-zero vector switching mode Vk in processing of S160, and the non-zero vector currents Idk and Iqk predicted to flow in the motor 10 when the inverter 12 operates in the specified non-zero vector switching mode Vk are calculated in S170.

In S180, an error ΔIdq0 between the current command values Id*, Iq*, and the zero vector currents Id0, Iq0 is compared with an error ΔIdqk between the current command values Id*, Iq* and the non-zero vector currents Idk, Iqk. Then, the switching mode corresponding to the vector current smaller in error is determined as the optimum switching mode V0 (V7) or Vk. Then, in S190, an operation signal corresponding to the optimum switching mode determined in S180 is output to the inverter 12.

As described above, in the αβ coordinate system, the vectors Ivec1 to Ivec6 of the currents flowing in the motor 10 are determined in the direction fixed relative to the zero vector currents Iα0 and Iβ0, according to the voltages applied in the six non-zero vector switching modes V1 to V6 of the inverter 12.

In the motor control device according to the present embodiment, attention is paid to the above matter, and the current vector Iveck closest to the current command values Iα* and Iβ* is specified according to those current vectors Ivec1 to Ivec6. Then, when the inverter 12 operates in the non-zero vector switching mode Vk corresponding to the specified current vector Iveck, only the non-zero vector currents Idk and Iqk predicted to flow in the motor 10 are calculated. For that reason, there is no need to calculate the current predicted to flow in the motor 10 in correspondence with all of the non-zero vector switching modes V1 to V6, and the arithmetic processing load can be remarkably reduced.

(Second Embodiment)

Figure 6:
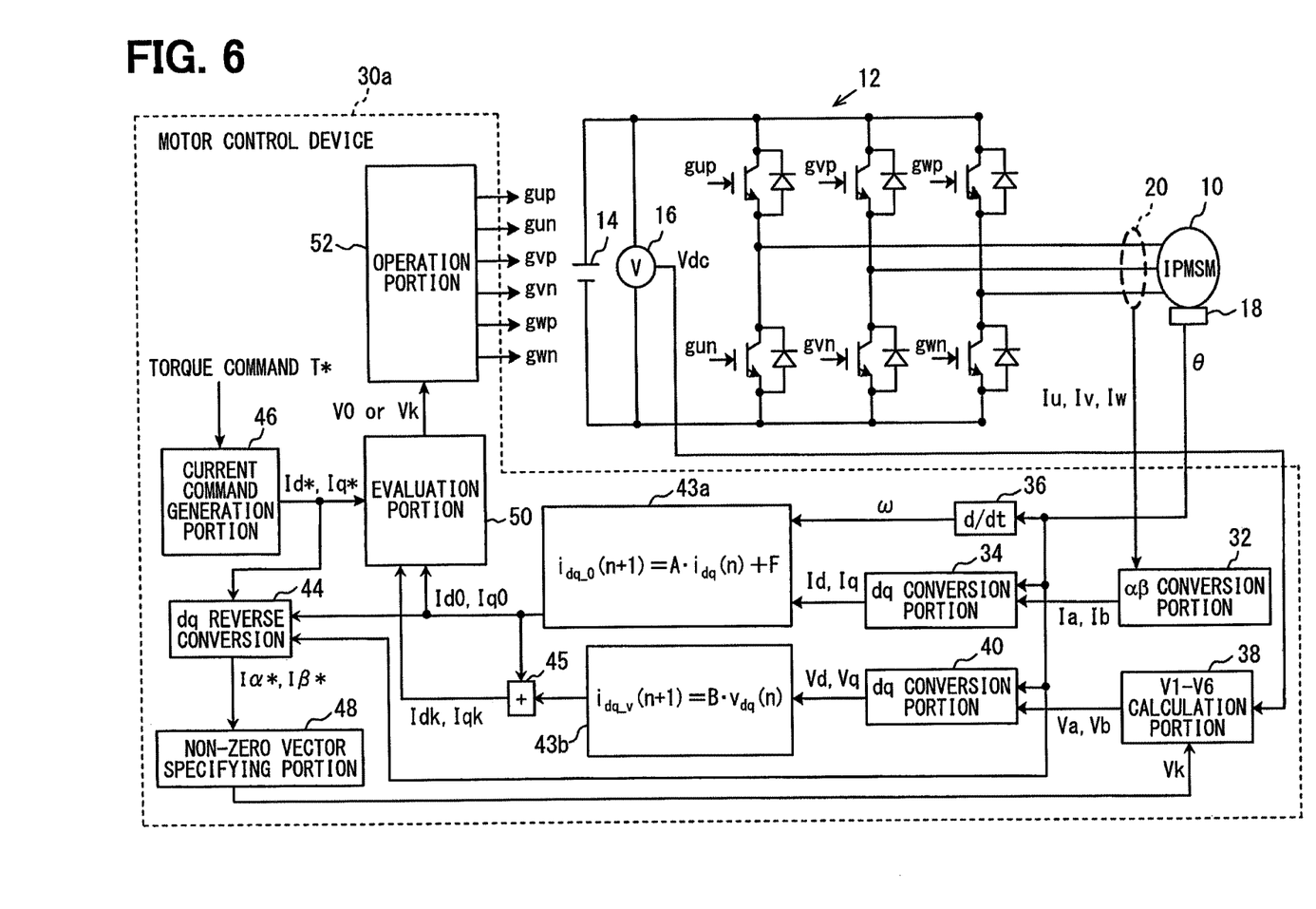
FIG. 6 is a block diagram illustrating a motor control device according to a second embodiment of the present disclosure.

Subsequently, a motor control device and a motor control method according to a second embodiment of the present disclosure will be described with reference to FIG. 6. The same configurations as that of the motor control device in the first embodiment are denoted by identical reference numerals, and their description will be omitted.

In the motor control device according to the above-mentioned first embodiment, the same Expression 2 is used when the predicted current arithmetic portion 42 calculates the zero vector currents Id0 and Iq0 and when the predicted current arithmetic portion 42 calculates the non-zero vector currents Idk and Iqk. However, in calculating the zero vector currents Id0 and Iq0, because the inverter voltages Vd and Vq are zero, the term related to the inverter voltages Vd and Vq on the second term of the right side in Expression 2 is unnecessary. Also, in calculating the non-zero vector currents Idk and Iqk, the first term of the right side and the third term of the right side other than the second term of the right side in Expression 2 are the same as those of the zero vector current.

Therefore, as in the first embodiment, when the numerical expression for calculating the zero vector currents Id0 and Iq0 is identical with the numerical expression for calculating the non-zero vector currents Idk and Iqk, unnecessary terms are included in the respective numerical expressions, and unnecessary arithmetic processing is unavoidably conducted.

For that reason, in a motor control device 30*a* according to the present embodiment, the predicted current arithmetic portion is divided into a first arithmetic portion 43*a* for calculating the zero vector currents Id0 and Iq0, and a second arithmetic portion 43*b* for calculating a term related to the inverter voltage necessary for calculating the non-zero vector currents Idk and Iqk. Specifically, the first arithmetic portion 43*a* calculates the zero vector currents Id0 and Iq0 according to the following Expression 3.

$$i_{dq\_0}(n+1) = A \cdot i_{dq}(n) + F \quad [\text{Ex. 3}]$$

Also, the second arithmetic portion 43*b* calculates a current generated by the inverter voltages Vd and Vq according to the following Expression 4.

$$i_{dq\_v}(n+1) = B \cdot v_{dq}(n) \quad [\text{Ex. 4}]$$

Further, an addition portion 45 that adds arithmetic results (Id0, Iq0) by the first arithmetic portion 43*a* to arithmetic results (Idv, Iqv) by the second arithmetic portion 43*b* is provided, and the non-zero vector currents Idk and Iqk are output from the addition portion 45. This is because in calculating the non-zero vector currents Idk and Iqk, the term related to the present current, and the term related to the speed electromotive force of the motor are common to the zero vector currents Id0 and Iq0.

Because the configuration described above is employed, according to the present embodiment, the zero vector currents Id0 and Iq0 and the non-zero vector currents Idk and Iqk can be calculated efficiently without unnecessary arithmetic processing, thus the arithmetic processing load can be further reduced.

(Third Embodiment)

Subsequently, a motor control device and a motor control method according to a third embodiment of the present disclosure will be described with reference to FIG. 7. The same configurations as that of the motor control device in the first embodiment and the second embodiment are denoted by identical reference numerals, and their description will be omitted.

In the above-mentioned motor control devices 30 and 30*a* according to the first and second embodiments, in calculating the non-zero vector currents Idk and Iqk, first in the V1-V6 calculation portion 38, when the inverter operates in the non-zero vector switching mode Vk, the inverter voltages Vα and Vβ to be applied to the motor 10 are calculated, and the calculated inverter voltages are converted into the inverter voltages Vd and Vq in the dq coordinates on the basis of the motor rotating angle θ.

Figure 7:
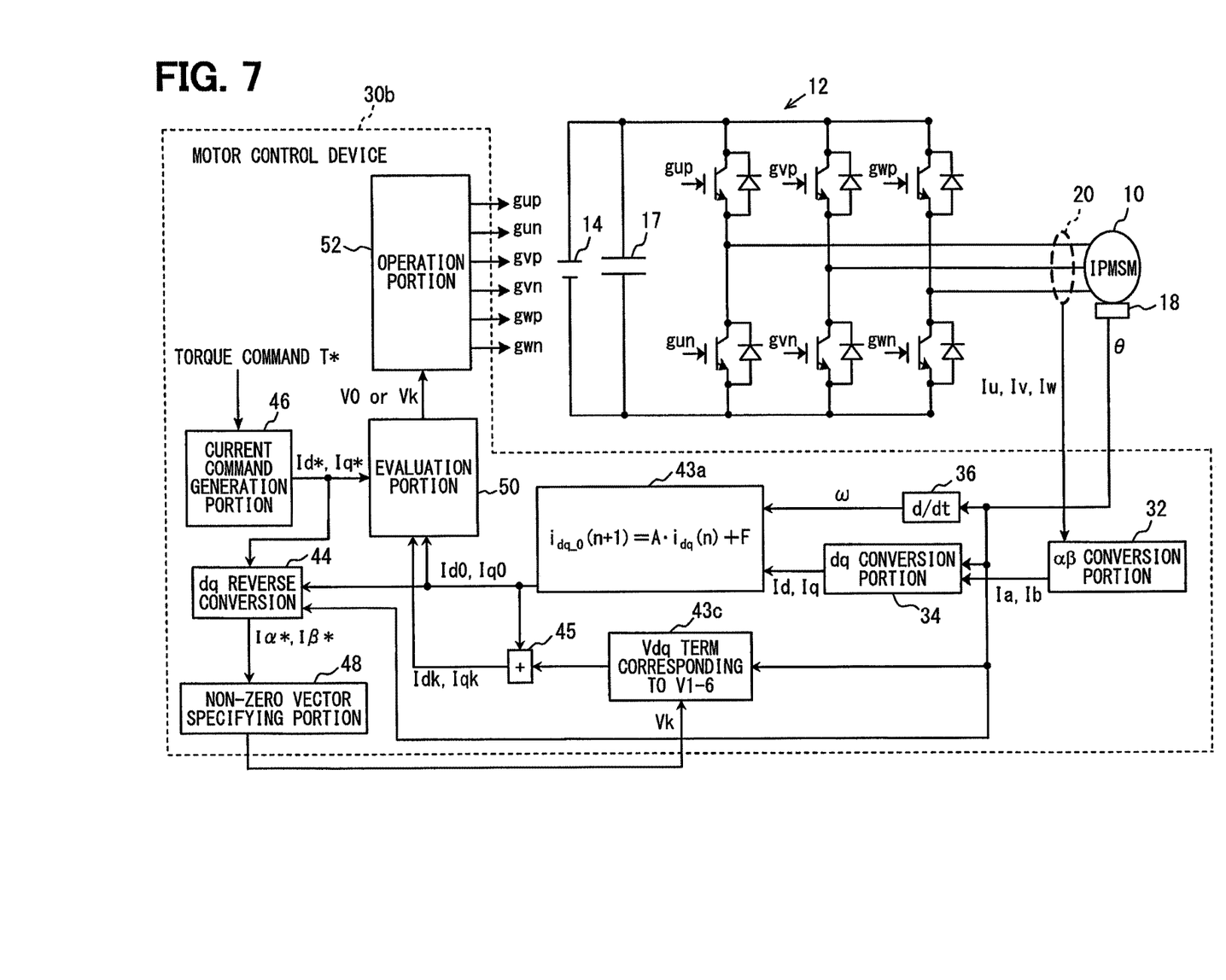
FIG. 7 is a block diagram illustrating a motor control device according to a third embodiment of the present disclosure.

However, for example, as illustrated in FIG. 7, when the magnitude of the input voltage to the inverter 12 is held substantially constant by connecting a capacitor 17 having a relative large capacity to the inverter 12, there is no need to consider the input voltage Vdc to the inverter 12.

Therefore, in this case, as illustrated in FIG. 7, a second arithmetic portion 43c of the predicted current arithmetic portion can calculate a current (Idv, Iqv) generated by the voltage applied to the motor 10 taking only the motor rotating angle θ into account when the inverter 12 operates in the non-zero vector switching mode Vk. For that reason, the voltage sensor 16 can be reduced in the motor control device 30a according to the second embodiment, and the arithmetic processing load can be further reduced.

In a second arithmetic portion 43c of the predicted current arithmetic portion, a current (Idv, Iqv) generated by a voltage applied to the motor 10 may be calculated with the use of a numerical expression, or for example, a one-dimensional map that puts the currents (Idv, Iqv) corresponding to the motor rotating angle θ together may be prepared in advance, and an appropriate current (Idv, Iqv) may be selected from the map.

The preferable embodiments of the present disclosure have been described above. However, the present disclosure is not limited to the above-mentioned embodiments, and can be implemented with various modifications without departing from the spirit of the present disclosure.

For example, in the above-mentioned first embodiment to third embodiment, the optimum switching mode in one subsequent cyclic control is determined. However, in determining the optimum switching mode in two subsequent cyclic control, the present disclosure can be applied as described in, for example, Patent Document 2.

Also, the motor parameters such as a winding resistance value or an inductance value included in a prediction expression, or a value of the discrete time which are used in the predicted current arithmetic portion may be dynamically changed.

The invention claimed is:

1. A motor control device that determines a switching mode of an inverter so that a current flowing in a three-phase AC motor matches a command current, allows the inverter to operate in the switching mode that is determined, and applies a voltage corresponding to the switching mode to the three-phase AC motor to control the rotation of the three-phase AC motor, the motor control device comprising:
   a zero vector current arithmetic portion calculating a current predicted to flow in the three-phase AC motor as a zero-vector current when the inverter operates in a zero vector switching mode in which no voltage is applied to the three-phase AC motor;
   a current vector selection portion selecting a current vector closest to the command current among current vectors flowing in the three-phase AC motor which are set in directions fixed relative to the zero vector current when the inverter operates in six non-zero vector switching modes where a voltage is applied to the three-phase AC motor,
   in an αβ static coordinate system which is defined by an α-axis and a (β-axis orthogonal to each other with a rotation axis of a rotor of the three-phase AC motor as an origin;
   a non-zero vector current arithmetic portion calculating a current predicted to flow in the three-phase AC motor as the non-zero vector current when the inverter operates in the non-zero vector switching modes corresponding to the current vector selected by the current vector selection portion; and
   a current selection portion selecting a current close to the command current from the zero vector current and the non-zero vector current,
   wherein the switching mode corresponding to the current selected by the current selection portion is determined as the switching mode of the inverter.

2. The motor control device according to claim 1, wherein the non-zero vector current arithmetic portion calculates a current generated by applying the voltage corresponding to the non-zero vector switching mode to the three-phase AC motor when operating the inverter in the non-zero vector switching mode corresponding to the current vector selected by the current vector selection portion, and calculates the non-zero vector current by adding the calculated current to the zero vector current calculated by the zero vector current arithmetic portion.

3. The motor control device according to claim 2, wherein the non-zero vector current arithmetic portion calculates a current generated by the three-phase AC motor by assuming that a magnitude of the voltage to be applied to the three-phase AC motor is kept constant by the inverter, when operating the inverter in the non-zero vector switching mode.

4. A motor control method that determines a switching mode of an inverter so that a current flowing in a three-phase AC motor matches a command current, allows the inverter to operate in the switching mode that is determined, and applies a voltage corresponding to the switching mode to the three-phase AC motor to control the rotation of the three-phase AC motor, the motor control method comprising the steps of:
   calculating, by a motor control device, a current predicted to flow in the three-phase AC motor as a zero-vector current when the inverter operates in a zero vector switching mode in which no voltage is applied to the three-phase AC motor;
   selecting, by the motor control device, a current vector closest to the command current among current vectors flowing in the three-phase AC motor which are set in directions fixed relative to the zero vector current when the inverter operates in six non-zero vector switching modes where a voltage is applied to the three-phase AC motor, in an αβ static coordinate system which is defined by an α-axis and a (β-axis orthogonal to each other with a rotation axis of a rotor of the three-phase AC motor as an origin;
   calculating, by the motor control device, a current predicted to flow in the three-phase AC motor as the non-zero vector current when the inverter operates in the non-zero vector switching mode corresponding to the selected current vector;
   selecting by the motor control device, a current close to the command current from the zero vector current and the non-zero vector current; and
   determining, by the motor control device, the switching mode corresponding to the selected current as the switching mode of the inverter.

5. The motor control method according to claim 4, wherein in the step of calculating the non-zero vector current, a current generated by applying the voltage corresponding to the non-zero vector voltage switching mode to the three-phase AC motor when operating the inverter in the non-zero vector switching mode corresponding to the selected current vector is calculated, and the non-zero vector current is calculated by adding the calculated current to the zero vector current.

6. The motor control method according to claim 5, wherein in the step of calculating the non-zero vector current, a current generated by the three-phase AC motor is calculated assuming that a magnitude of the voltage to be applied to the three-phase AC motor is kept constant by the inverter, when operating the inverter in the non-zero vector switching mode.

\* \* \* \* \*